Dec. 19, 1939.    R. O. CHAFFEE    2,184,250
SNAP FASTENER STUD
Original Filed March 5, 1937
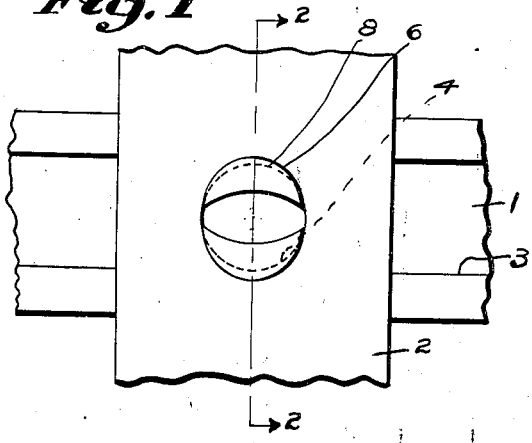
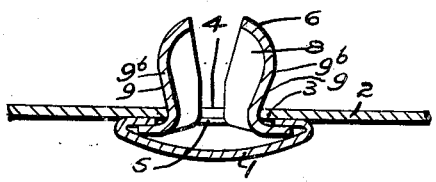
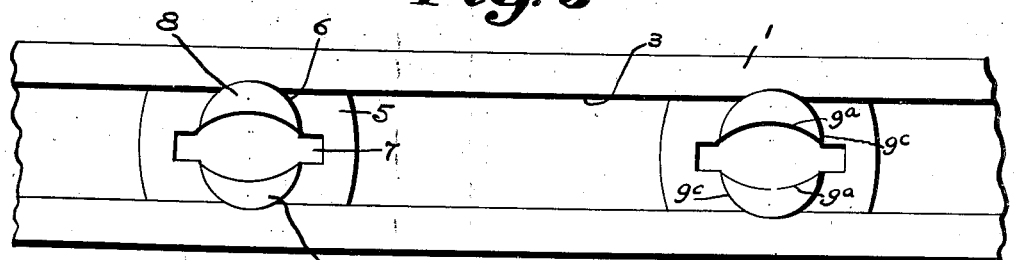
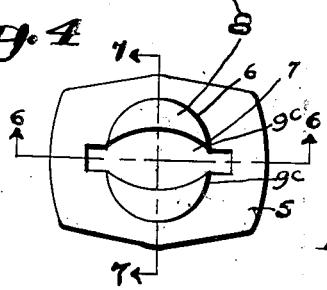
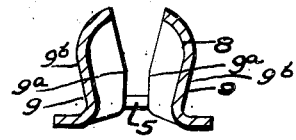
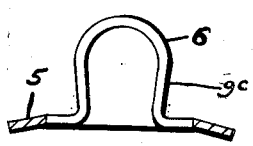
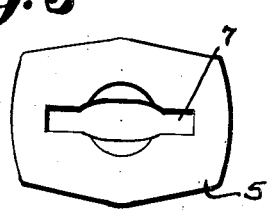
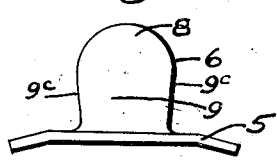
Inventor:
Raymond O. Chaffee.
by Walter S. Jones
Att'y.

Patented Dec. 19, 1939

2,184,250

UNITED STATES PATENT OFFICE 2,184,250

SNAP FASTENER STUD

Raymond O. Chaffee, Belmont, Mass., assignor to United-Carr Fastener Corporation, Cambridge, Mass., a corporation of Massachusetts Original application March 5, 1937, Serial No. 129,215. Divided and this application December 3, 1937, Serial No. 177,963

2 Claims. (Cl. 24—213)

My invention aims to provide improvements in snap fastener studs particularly for use in attaching hollow metal moldings.

Reference is hereby made to my application Serial No. 129,215, filed March 5, 1937, which contains claims to the method of making my improved stud and of which this application is a division.

Referring to the drawing in which I have illustrated a preferred embodiment of my invention:

Figure 1 is a rear view of an installation showing my improved stud member;

Fig. 2 is a section taken along the line 2—2 of Fig. 1;

Fig. 3 is a rear view showing a molding strip with my improved fasteners in position for securing a molding strip to a support;

Fig. 4 is a top view of my improved fastener member per se;

Fig. 5 is a bottom view of the fastener shown in Fig. 4;

Fig. 6 is a section taken along the line 6—6 of Fig. 4;

Fig. 7 is a section taken along the line 7—7 of Fig. 4; and

Fig. 8 is a side view of the fastener member shown in Fig. 4.

My invention, as illustrated in the accompanying drawing, is particularly, though not exclusively, adapted for use in attaching molding strips and the like to a metal support and includes a one-piece metal fastener for accomplishing the desired result.

The particular parts chosen to illustrate the use of my improved fastener include a relatively narrow molding strip 1 such as is now frequently used on the bodies of automobiles and elsewhere and a relatively thin supporting member 2. It should be understood, however, that this is not the sole use of my improved fastener and that it may be used to fasten other parts together.

The molding strip 1 is of the type having an aperture 3 running the whole length of one of its sides, the aperture having a width great enough to permit passage of the socket-engaging portion of the fastener. The continuous aperture 3 permits adjustment of the fastener in any desirable position. The supporting member 2 is preferably of relatively thin material having circular aperture 4 to receive the socket-engaging portions of the fastener.

The stud member which is the subject of my present invention is of the type having a base plate and a socket-engaging head portion pressed from the base, the head portion being divided by a slit into two resilient portions for engagement with a cooperating aperture. I am aware that it is well known in the art to divide a stud head by a single slit into two resilient portions, but my stud member, though broadly like previously known fasteners, is constructed in a particular way to have advantages, such as capability of providing a drawing action and an adaptability to various thicknesses of metal, which is directed to an improvement in the art.

Referring to my fastener per se, I have shown a simple one-piece device formed from a relatively small blank. The stud member has an elongated rectangular base 5 and a head portion 6 pressed from the base. The head portion is made resilient by a slit 7 extending entirely through the head and into the base (Figs. 3, 4 and 5) lengthwise of the base. The head portion is thus divided by the slit into two petals 8 having the same contour and cross-section. At one step in formation of the fastener, the head portion 6 preferably is pinched very slightly near its junction with the base 5 so as to form a slight bulge in the head on the other side of the pinched portion from the base. It is important to note, however, that the aforementioned bulge is not sufficiently protuberant to act as a shoulder means for holding two pieces of material together in normal use of the fastener. In order that proper support-engaging shoulder means may be provided the petals are spread apart so that opposed free edges 9ª—9ª of the petals adjacent the slot extend from the base in parallel relation for a predetermined distance and then diverge toward the free end of the head as most clearly shown in Fig. 7. When the spreading of the petals 8 is complete the head 6 is then circular in cross-section adjacent to the base 5 (Figs. 5, 6 and 7) and oval in cross-section as the petals 8 diverge (Figs. 1 and 4). Thus the same time the surfaces of the petals 8 diverge in substantially straight lines from points near the base before converging to form the guide means so as to provide gradually tapering portions 9—9 (Fig. 7). As a result of the construction hereinabove described the petals are provided with tapering shoulder means 9ᵇ—9ᵇ on the sides facing the longitudinal edges of the base 5 (Fig. 7), but the petals are substantially shoulderless at sides 9ᶜ—9ᶜ (Figs. 4 and 8) immediately adjacent the slit 7 which face the transverse edges of the base (Figs. 6 and 8).

Assembly of the component parts of the installation may be effected by first sliding into the molding the bases of as many fasteners as there are apertures 4 in the support member 2. In order to restrain longitudinal movement of the fasteners relative to the molding after they have once been assembled in proper position the bases of the fasteners are preferably arched lengthwise, as most clearly shown in Figs. 6 and 8, providing a slight resiliency in the base for engagement with the sides of the molding. In the next step the head portions of the fasteners are inserted through the circular apertures 4 of the supporting member. As a result of the relatively straight tapering broad sides of the petals a drawing action takes place during insertion of the head portions into the apertures 4 of the support 2 causing the material of the molding adjacent the aperture 3 to be drawn tightly against the support so as to prevent any looseness between the parts. Also, the particular construction of the shank 9 of my fastener provides a tight fastening even though the parts may have various thicknesses.

Thus, my fastener member has had great commercial usefulness due to its single-slot construction whereby it provides a base sufficiently narrow to be assembled with a narrow molding strip such as that hereinabove mentioned, and also, a socket-engaging portion of sufficient size and strength to hold firmly a molding in tight abutting relation to a supporting member.

While I have illustrated and described a preferred embodiment of my invention, I do not wish to be limited thereby because the scope of my invention is best defined by the following claims.

I claim:

1. A snap fastener stud member having a base and a head portion extending from and integral with the central portion of said base, said head portion comprising a pair of substantially identical resilient petals having diverging shoulders for engagement with a socket member, said head and said base having a slit dividing the same into said petals, and said petals diverging progressively away from each other beginning where they join the base to provide said shoulder means on opposed surfaces for said stud to adjust itself to parts of various thicknesses, said head being substantially circular in cross-section adjacent to where it joins the base and being oval in cross-section at the diverging portions thereby permitting insertion into a hole the diameter of the circular portion of said head by a snap action.

2. A snap fastener stud member comprising a base and a stud portion integral therewith and extending from the central part of said base, said stud and a substantial portion of the base being divided axially, providing an elongated slot in said base and opposed duplicate petals of approximately semi-cylindrical form, said petals extending from the base in diverging relation to each other presenting a slotted stud member with progressively sloping sides along one medial plane, said stud being substantially circular in cross section where it joins the base, the head end being of elongated circular cross section, said opposed petals being resiliently compressible toward each other in the plane of its greatest diameter of the head end, thereby permitting insertion of the stud into a substantially circular aperture by a snap action.

RAYMOND O. CHAFFEE.